US009558377B2

(12) United States Patent
Wendling et al.

(10) Patent No.: US 9,558,377 B2
(45) Date of Patent: Jan. 31, 2017

(54) ELECTRONIC ACCESS CONTROL SYSTEMS INCLUDING PASS-THROUGH CREDENTIAL COMMUNICATION DEVICES AND METHODS FOR MODIFYING ELECTRONIC ACCESS CONTROL SYSTEMS TO INCLUDE PASS-THROUGH CREDENTIAL COMMUNICATION DEVICES

(71) Applicant: WaveLynx Technologies Corporation, Broomfield, CO (US)

(72) Inventors: Jean-Hugues Wendling, Denver, CO (US); Michael Thomas Conlin, Superior, CO (US)

(73) Assignee: WaveLynx Technologies Corporation, Broomfield, CO (US)

( * ) Notice: Subject to any disclaimer, the term of this patent is extended or adjusted under 35 U.S.C. 154(b) by 87 days.

(21) Appl. No.: 14/591,568

(22) Filed: Jan. 7, 2015

(65) Prior Publication Data

US 2016/0197893 A1 Jul. 7, 2016

(51) Int. Cl.
*H04L 29/06* (2006.01)
*G06F 21/86* (2013.01)
*G06F 21/35* (2013.01)
*G07C 9/00* (2006.01)

(52) U.S. Cl.
CPC ............ *G06F 21/86* (2013.01); *G06F 21/35* (2013.01); *G07C 9/00309* (2013.01); *G07C 2009/00412* (2013.01)

(58) Field of Classification Search
CPC .............................. H04L 9/3215; G06F 21/35

USPC .......................... 713/168, 165, 194
See application file for complete search history.

(56) References Cited

U.S. PATENT DOCUMENTS

| | | |
|---|---|---|
| D495,237 S | 8/2004 | Tozer |
| D495,582 S | 9/2004 | Richardson et al. |
| D508,195 S | 8/2005 | Pack et al. |
| 7,093,130 B1 * | 8/2006 | Kobayashi ............. G06F 21/64 705/67 |
| D538,628 S | 3/2007 | Johansson |
| 7,260,835 B2 | 8/2007 | Bajikar |
| 7,315,823 B2 | 1/2008 | Bröndrup |
| D568,143 S | 5/2008 | Sclater |
| D582,255 S | 12/2008 | Turpault et al. |
| 7,463,861 B2 | 12/2008 | Eisenbach |
| 7,669,054 B2 | 2/2010 | Fox |
| 7,706,778 B2 | 4/2010 | Lowe |
| 7,707,625 B2 | 4/2010 | Klinefelter |
| 7,793,353 B2 | 9/2010 | Klinefelter et al. |
| 7,967,213 B2 | 6/2011 | Michalk |

(Continued)

FOREIGN PATENT DOCUMENTS

| | | |
|---|---|---|
| CA | 103200 A | 7/2004 |
| CA | 2497551 A | 10/2004 |

(Continued)

*Primary Examiner* — Haresh N Patel
(74) *Attorney, Agent, or Firm* — Faegre Baker Daniels LLP

(57) ABSTRACT

Electronic access control systems and methods address one or more weaknesses of conventional electronic access control systems. In some cases, an electronic access control system includes a secure communication channel for transmitting information to the access control system computer (ACC). In some cases, a method secures the communication channel between user access credentials (UACs) and the ACC.

23 Claims, 8 Drawing Sheets

(56) References Cited

U.S. PATENT DOCUMENTS

| | | |
|---|---|---|
| 7,986,917 B2 | 7/2011 | Ahlgren et al. |
| 8,045,961 B2 | 10/2011 | Ayed et al. |
| D647,810 S | 11/2011 | Bohrer |
| 8,112,066 B2 | 2/2012 | Ben Ayed |
| 8,165,525 B2 | 4/2012 | Eisenbach |
| 8,183,980 B2 | 5/2012 | Davis et al. |
| 8,295,298 B2 | 10/2012 | Kastner et al. |
| D673,533 S | 1/2013 | Ennabli |
| D676,835 S | 2/2013 | Ennabli |
| D678,254 S | 3/2013 | Ennabli |
| 8,527,613 B2 | 9/2013 | Malone et al. |
| D696,255 S | 12/2013 | Bousfield et al. |
| 8,619,244 B2 | 12/2013 | Hecker et al. |
| D698,683 S | 2/2014 | Ennabli |
| 8,646,770 B2 | 2/2014 | Meier et al. |
| 8,674,805 B2 | 3/2014 | Charych |
| D702,580 S | 4/2014 | Andersen |
| D709,397 S | 7/2014 | Ennabli |
| 8,791,790 B2 | 7/2014 | Robertson et al. |
| 2004/0143737 A1* | 7/2004 | Teicher .............. G07C 9/00015 713/167 |
| 2004/0215980 A1* | 10/2004 | Hamid ................ G06F 21/6218 726/28 |
| 2005/0005108 A1* | 1/2005 | Harper ...................... H04L 9/08 713/165 |
| 2005/0005156 A1* | 1/2005 | Harper ...................... H04L 9/08 726/26 |
| 2007/0043954 A1* | 2/2007 | Fox ........................ G06F 21/34 713/185 |
| 2007/0176739 A1 | 8/2007 | Raheman |
| 2007/0200665 A1 | 8/2007 | Studerus |
| 2008/0144824 A1* | 6/2008 | Stewart .................... H04K 1/00 380/257 |
| 2008/0290990 A1 | 11/2008 | Schaffzin et al. |
| 2009/0065592 A1* | 3/2009 | Paul ....................... G06F 21/77 235/492 |
| 2010/0100733 A1* | 4/2010 | Jaber ..................... H04L 9/3215 713/168 |
| 2010/0120362 A1 | 5/2010 | Walley et al. |
| 2010/0201586 A1 | 8/2010 | Michalk |
| 2011/0291798 A1 | 12/2011 | Schibuk |
| 2012/0038141 A1 | 2/2012 | Michalk |
| 2012/0040639 A1 | 2/2012 | Brisebois et al. |
| 2012/0169821 A1 | 7/2012 | Meier et al. |
| 2012/0265988 A1* | 10/2012 | Ehrensvard ............ G06F 21/35 713/165 |
| 2013/0075476 A1 | 3/2013 | Doran |
| 2013/0097348 A1 | 4/2013 | Milbrandt |
| 2013/0117078 A1* | 5/2013 | Weik, III .............. G06Q 10/00 705/13 |
| 2013/0221094 A1* | 8/2013 | Smith ................ G07C 9/00309 235/382 |
| 2013/0311791 A1* | 11/2013 | Falk ........................ G06F 21/55 713/194 |
| 2014/0049587 A1 | 2/2014 | Rieck et al. |
| 2014/0118147 A1 | 5/2014 | Davis |
| 2014/0145823 A1 | 5/2014 | Aase |
| 2014/0337930 A1* | 11/2014 | Hoyos ..................... H04L 63/10 726/4 |
| 2015/0142669 A1* | 5/2015 | Landrok ............ G06Q 20/351 705/71 |
| 2015/0254463 A1* | 9/2015 | Ryhorchuk ........... G06F 21/602 713/156 |
| 2015/0324792 A1* | 11/2015 | Guise .................... G06Q 20/38 705/71 |

FOREIGN PATENT DOCUMENTS

| | | |
|---|---|---|
| CA | 2558223 A | 9/2005 |
| CA | 2507277 A | 11/2005 |
| CA | 2567069 A | 12/2005 |
| CA | 128306 S | 8/2009 |
| CA | 133879 A | 8/2010 |
| CA | 149704 A | 12/2013 |
| EP | 1743443 A2 | 11/2005 |
| EP | 2014406 A3 | 1/2009 |
| EP | 2039460 A2 | 3/2009 |
| EP | 2116366 A | 11/2009 |
| EP | 2125378 A | 12/2009 |
| EP | 2335933 A | 6/2011 |
| EP | 2216866 A3 | 7/2011 |
| EP | 2568407 A2 | 3/2013 |
| EP | 2573718 A1 | 3/2013 |
| EP | 2626814 A1 | 8/2013 |
| EP | 2592030 A3 | 7/2014 |
| EP | 2757216 A2 | 7/2014 |
| WO | 2007020622 A2 | 2/2007 |
| WO | 2007104499 A2 | 9/2007 |
| WO | 2008048933 A2 | 4/2008 |
| WO | 2009030979 A3 | 3/2009 |
| WO | 2009135823 A4 | 11/2009 |
| WO | 2010094790 A1 | 8/2010 |
| WO | 2011085174 A3 | 7/2011 |
| WO | 2012125897 A3 | 9/2012 |
| WO | 2013117994 A1 | 8/2013 |
| WO | 2013137880 A1 | 9/2013 |
| WO | 2013182576 A3 | 12/2013 |
| WO | 2014016695 A3 | 1/2014 |
| WO | 2014016699 A3 | 1/2014 |
| WO | 2014071916 A3 | 5/2014 |
| WO | 2014071920 A3 | 5/2014 |
| WO | 2014075056 A3 | 5/2014 |

* cited by examiner

ELECTRONIC ACCESS CONTROL SYSTEMS INCLUDING PASS-THROUGH CREDENTIAL COMMUNICATION DEVICES AND METHODS FOR MODIFYING ELECTRONIC ACCESS CONTROL SYSTEMS TO INCLUDE PASS-THROUGH CREDENTIAL COMMUNICATION DEVICES

TECHNICAL FIELD

The present invention relates to a systems and methods for electronic access control. More particularly, the present invention relates to electronic access control systems including a secure communication channel and cryptographic secrets and methods for securing the communication channels and the cryptographic secrets of electronic access control systems.

BACKGROUND

FIG. 1A illustrates an example of a conventional electronic access control system 100. A user at an access point (for example, a doorway) requests access to a secure area 102 of a facility (for example, the interior of a building) by presenting a wireless user access credential (UAC) 104 to a credential communication device (CCD) 106 (for example, by positioning the UAC in the vicinity of the CCD). The UAC 104 may be, for example, a secure smart card or a smart mobile phone. The CCD 106 communicates with the UAC 104 to obtain an access control identification number (ACIN) and transmits the ACIN to an access control system computer (ACC) 108. If the UAC 104 is authorized to enter the secure area 102, the ACC 108 grants access to the UAC 104, for example, by temporarily opening a lock 110 at the access point (for example, a door lock), for example, via a lock control channel 112.

In the case where the UAC 104 is a secure smart card, the ACIN can be securely stored in the secure memory of the smart card 104. A cryptographic process, such as a mutual authentication and data signing and encrypting, is performed between the smart card 104 and the CCD 106, creating an enciphered channel 114. The CCD 106 contains the cryptographic algorithm and cryptographic key for obtaining the ACIN. Once the ACIN is obtained, it is transmitted by the CCD 106 to the ACC 108 using a conventional communication channel 116. Typically, the channel 116 between the CCD 106 and the ACC 108 is a one-way channel, such as a Wiegand channel, that cannot be cryptographically protected, and/or the ACC 108 does not have the capability to perform cryptographic algorithms. This conventional system configuration may be disadvantageous due to inherent security weaknesses.

For example, one potential weakness of these conventional systems is the fact that the cryptographic keys are stored in the CCD 106, which is mounted in an unsecure area of a facility (for example, the exterior of a building). Therefore, the CCD 106 can be removed and reverse engineered to access the cryptographic keys. Another potential weakness relates to the one-way, unsecured channel 116 between the CCD 106 and the ACC 108. Because this channel 116 is unsecured and unencrypted, the information transmitted via the channel 116 (that is, ACINs) can often easily be recorded and played back, leaving ACINs vulnerable to simple attacks, such as repeat attacks.

FIG. 1B illustrates an example of a conventional CCD 106 for a conventional access control system 100. The CCD 106 communicates wirelessly with a UAC 104. The CCD 106 includes a controller 118 that contains cryptographic keys within a non-volatile memory 120 that is accessed by a processor 122. Optionally, the cryptographic keys can be contained in an additional device 124, such as a secure element. The secure element 124 can be accessed by the processor 122 and, in some cases, can optionally perform the cryptographic algorithms. In either case, however, the cryptographic keys are contained in the CCD 106, and the CCD 106 is mounted in an unsecure area, creating a weakness in the system. As shown in FIG. 1B, the CCD 106 typically also includes an RF front end 126 coupled to an antenna 128. The RF front end 126 and antenna 128 enable wireless (for example, RF) communication 130 between the CCD 106 and the UAC 104. Additionally, any number of data transfer lines 132 may be coupled to the controller 118. The CCD is typically powered using power and ground lines 134.

Control lines 136 control the device LEDs and/or sounder 138 to give the user useful feedback. Typically, the access point lock control line is connected to the green LED control line of the device. In this case, the user can see that the access point is unlocked when the green LED is illuminated. However, the lock control line often is easily accessed, and grounding the control line may unlock the access point. As such, the accessibility of the lock control lines creates another potential weakness in the system.

SUMMARY

Embodiments of the present invention include an electronic access control system. The electronic access control system secures an access point (for example, a doorway) to a first secure area of a facility (for example, the interior of a building). The electronic access control system permits access to the first secure area upon presentation of an authorized user access credential including access control identification information (for example, a smart card, an electronic mobile device such as a cellular phone, or the like). In embodiments, the electronic access control system includes a pass-through credential communication device that is adapted to be disposed proximate the access point and to which the authorized user access credential is presented. The pass-through credential communication device may be adapted for bi-directional communication with the authorized user access credential. The electronic access control system may further include a secure cryptographic module that is adapted to be disposed in a second secure area. In embodiments, the secure cryptographic module bi-directionally communicates with the pass-through credential communication device and may be adapted for bi-directional communication with the authorized user access credential via the pass-through credential communication device. The secure cryptographic module may be adapted to receive the access control identification information from the authorized user access credential, via the pass-through credential communication device, in an encrypted form. The secure cryptographic module may include a cryptographic key for decrypting the encrypted form of the access control identification information. In embodiments, the electronic access control system permits access to the first secure area in response to the secure cryptographic module decrypting the encrypted form of the access control identification information.

Embodiments of the present invention include a method for modifying an electronic access control system for securing an access point to a first secure area. The electronic access control system permits access to the first secure area upon presentation of an authorized user access credential including access control identification information. In embodiments, the method includes: removing a previously-installed credential communication device of the electronic access control system from a position proximate the access point; providing a pass-through credential communication device, the pass-through credential communication device being adapted for bi-directional communication with the authorized user access credential; positioning the pass-through credential communication device proximate the access point; providing a secure cryptographic module, the secure cryptographic module being adapted for bi-directional communication with the authorized user access credential via the pass-through credential communication device, the secure cryptographic module being adapted to receive the access control identification information from the authorized user access credential, via the pass-through credential communication device, in an encrypted form, and the secure cryptographic module comprising a cryptographic key for decrypting the encrypted form of the access control identification information; positioning the secure cryptographic module in a second secure area; and providing a bi-directional communication channel between the pass-through credential communication device and the secure cryptographic module.

Embodiments of the present invention provide an electronic access control system for securing an access point to a first secure area. The electronic access control system permits access to the first secure area upon presentation of an authorized user access credential including access control identification information. Embodiments of the system include a pass-through credential communication device that is adapted to be disposed proximate the access point and to which the authorized user access credential is presented. The pass-through credential communication device may be adapted for bi-directional communication with the authorized user access credential. In embodiments, the system further includes secure electronics that are adapted to be disposed in a second secure area. The secure electronics may bi-directionally communicate with the pass-through credential communication device and may be adapted for bi-directional communication with the authorized user access credential via the pass-through credential communication device. The secure electronics may be adapted to receive the access control identification information from the authorized user access credential, via the pass-through credential communication device, in an encrypted form. In embodiments, the secure electronics include a cryptographic key for decrypting the encrypted form of the access control identification information. In this manner, the system may permit access to the first secure area in response to the secure electronics decrypting the encrypted form of the access control identification information.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Although the term "block" may be used herein to connote different elements illustratively employed, the term should not be interpreted as implying any requirement of, or particular order among or between, various steps disclosed herein unless and except when explicitly referring to the order of individual steps.

DETAILED DESCRIPTION

Systems and methods, according to embodiments of the present invention, may address one or more of the weaknesses described above. Embodiments of the present invention relate to electronic access control systems that include a secure communication channel for an ACC. Additional, overlapping, and/or alternative embodiments of the present invention relate to methods for securing a communication channel between a UAC and an ACC.

Figure 2:
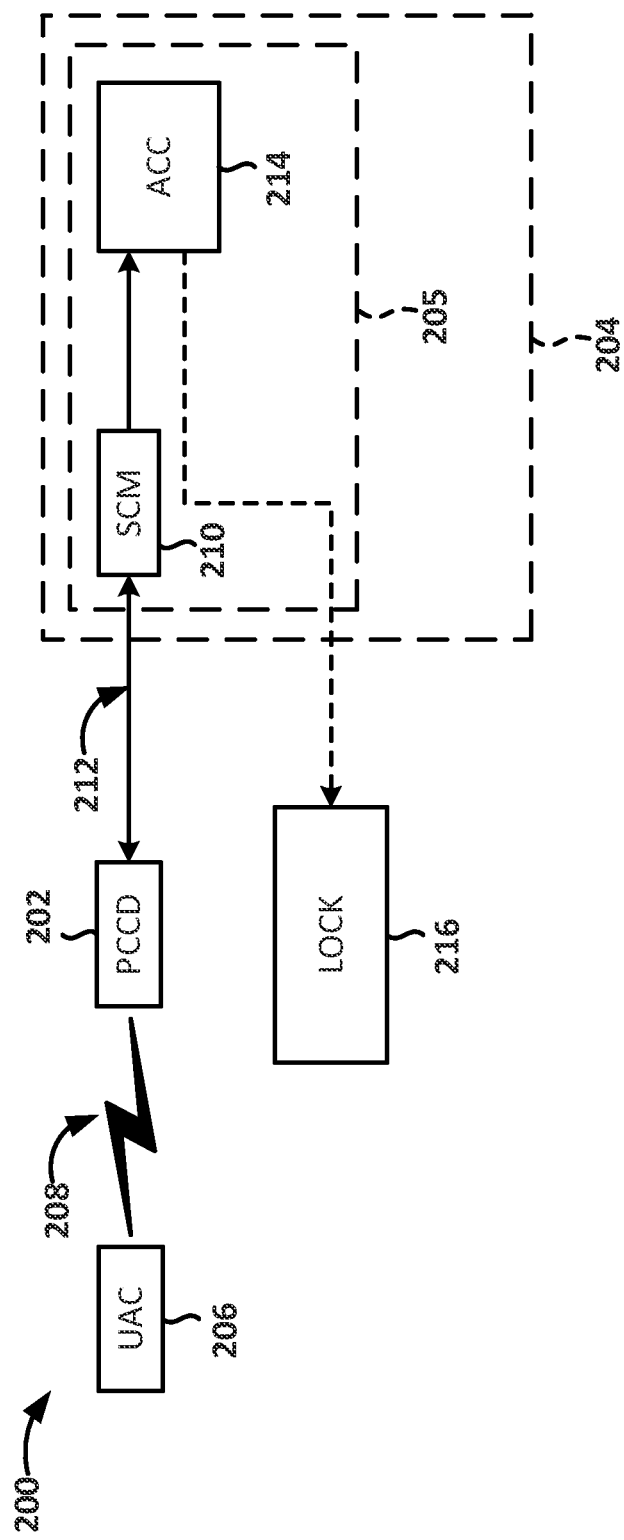
FIG. 2 illustrates an electronic access control system according to embodiments of the present invention.

FIG. 2 illustrates an electronic access control system 200 according to embodiments of the present invention. The illustrated system 200 includes a pass-through credential communication device (PCCD) 202 that is disposed in an unsecure area (for example, outside of a first secure area 204) of a facility (for example, on the exterior of a building) and proximate an access point (for example, a doorway) to the first secure area 204 of the facility (for example, the interior of the building). In operation, a UAC 206 (such as a secure smart card, a smart mobile phone, or the like) is presented (for example, via a wireless communication 208, such as, for example, Bluetooth®, ZigBee®, Z-Wave®, MiWi™, other forms of RF communication, and/or the like) to the PCCD 202 to gain access to the first secure area 204 via the access point. In embodiments, the distance or range of distances from which the UAC must be disposed from the PCCD 202 during the presentation may vary, for example, depending upon the communication technology used. The PCCD 202 securely and, in embodiments, bi-directionally communicates with a secure cryptographic module (SCM) 210 that is disposed within a second secure area 205 (for example, a secure room, closet, or other enclosure in the interior of the building). In embodiments, the PCCD 202 and the SCM 210 may communicate via a channel 212. The channel 212 may be configured as a wired channel, a wireless channel, or a combination thereof. In embodiments, for example, the channel 212 may utilize the RS-485 standard. The SCM 210 may bi-directionally communicate with the UAC 206 via the PCCD 202. The SCM 210 may receive access control identification information (for example, the ACIN) from the UAC 206, via the PCCD 202, in an encrypted form. In embodiments, the SCM 210 includes a cryptographic key for decrypting the encrypted form of the access control identification information. In turn, the SCM 210 may transmit the access control identification information to an ACC 214 disposed within the second secure area 205. The ACC 214 may review the access control identification information and, upon determining that the UAC 206 is authorized to enter the first secure area 204, may permit access to the first secure area 204 (for example, by releasing a lock 216 at the access point).

The term "access point," as used throughout this document, refers to a location at which physical access to a secure area (for example, the first secure area 204 depicted in FIG. 1) may be at least effectively restricted in a selective manner (for example, by allowing access only to a person holding an authorized UAC). For example, an access point may be, or include, one or more doors, one or more gates, one or more turnstiles, one or more barrier gates, one or more security gates, one or more security measures, and/or the like. In embodiments, for example, a secure area may include an interior of a building or a room, to which access is restricted at an access point that includes a lockable door; a back yard to which access is restricted at an access point that includes a gate; a transportation terminal to which access is restricted at an access point that includes a turnstile; a parking garage to which access is restricted at an access point that includes a barrier gate; a campus or other portion of land to which access is restricted at an access point that includes a security gate; and/or the like. In embodiments, the secure area may be a region to which access is effectively restricted at an access point that includes a security measure such as, for example, one or more laser sensors, motion detectors, and/or the like, where a UAC may be used to cause the security measure to be deactivated.

According to embodiments of the present invention, the system 200 does not require the cryptographic keys to be stored in the unsecure area of the facility (in contrast to conventional CCDs). Instead, embodiments of the system 200 permit the cryptographic keys to be stored in the second secure area 205 of the facility. In embodiments, the PCCD 202 may be a generic device because it does not need to contain any cryptographic keys. As a result, the system 200 may be relatively secure compared to conventional electronic access control systems. Furthermore, secure communication may take place between the UAC 206 and the SCM 210 via the PCCD 202 (in contrast to using the unsecure data channel between the CCD and the secure area in a conventional system).

According to embodiments of the present invention, the second secure area 205 may be the first secure area 204. In embodiments, the second secure area 205 may be within the first secure area 204. For example, the second secure area 205 may be a secure room within the first secure area 204, and the first secure area 204 may be the interior of a building. In embodiments, the second secure area 205 may not be within the first secure area 204 (that is, the second secure area 205 may be located separately from the first secure area 204). For example, the first secure area 204 may be, or include, a first room in the interior of a building, and the second secure area 205 may be, or include, a second, separate room in the interior of the building. As another example, the first secure area 204 may be, or include, a room in the interior of a first building, and the second secure area 205 may be, or include, a room in the interior of a second building. In embodiments, the first and second buildings may be proximate one another (for example, on a common campus) or remote from one another (for example, in different cities, states, or countries).

In embodiments, the SCM 210 may communicate with a single PCCD 202. In embodiments, the SCM 210 may communicate with multiple PCCDs 202, which each control access to a different access point. In embodiments, the ACC 214 may communicate with multiple SCMs 210, which each communicate with one or more PCCDs 202, which each control access to a different access point.

The illustrative system 200 shown in FIG. 2 is not intended to suggest any limitation as to the scope of use or functionality of embodiments of the present invention. Neither should the illustrative system 200 be interpreted as having any dependency or requirement related to any single component or combination of components illustrated therein. Additionally, any one or more of the components depicted in FIG. 2 may be, in embodiments, integrated with various ones of the other components depicted therein (and/or components not illustrated), all of which are considered to be within the ambit of the present invention.

Figure 1A:
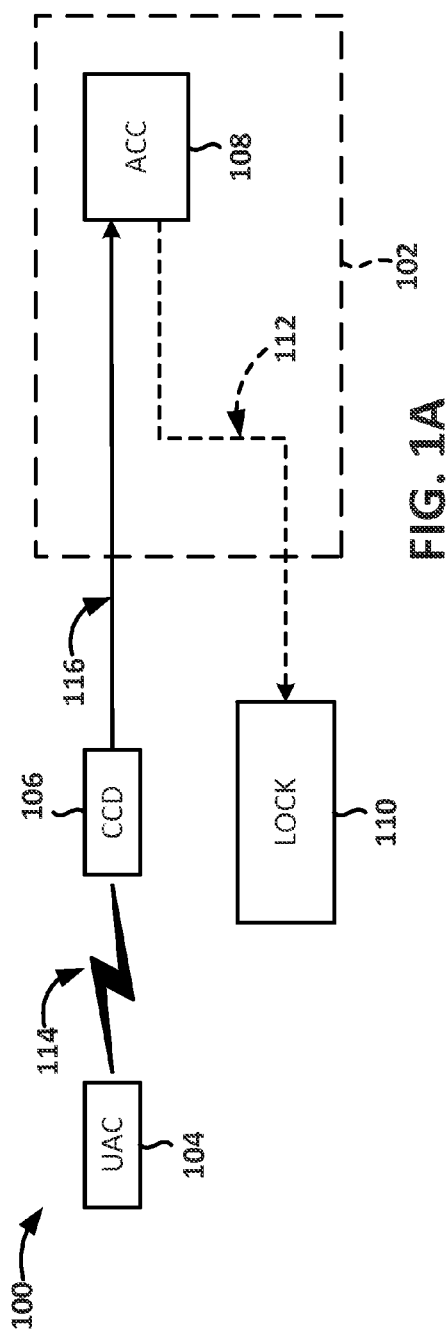
FIG. 1A illustrates an example of a conventional access control system.
Figure 1B:
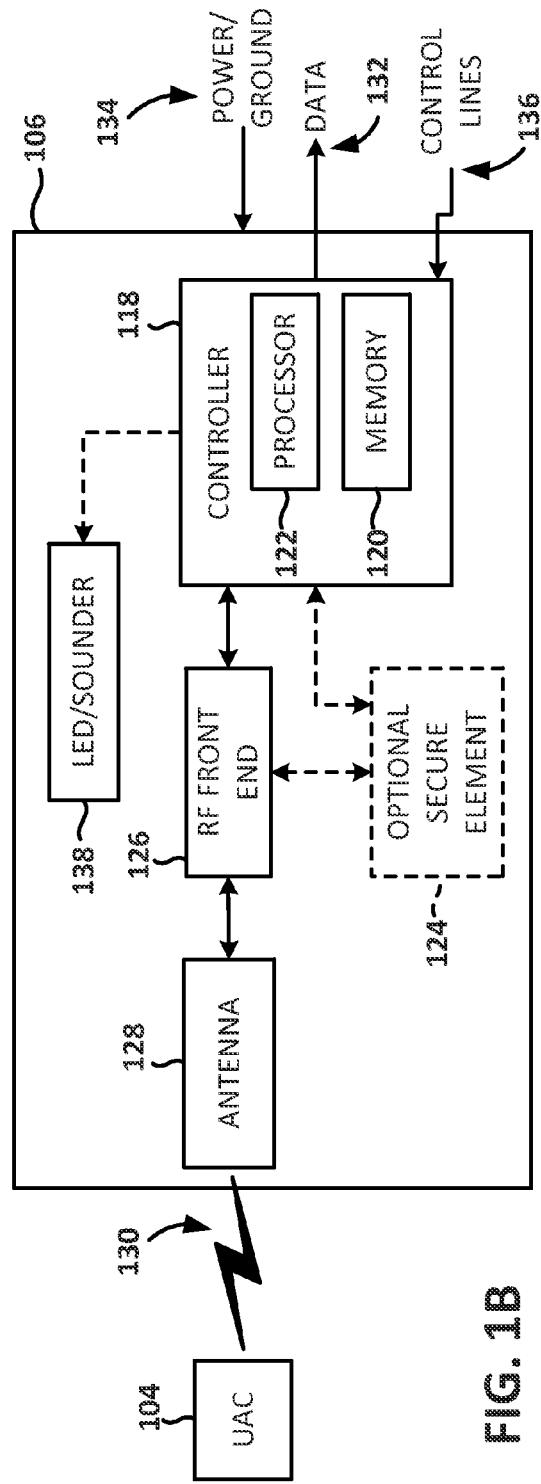
FIG. 1B illustrates an example of a conventional credential communication device.
Figure 3:
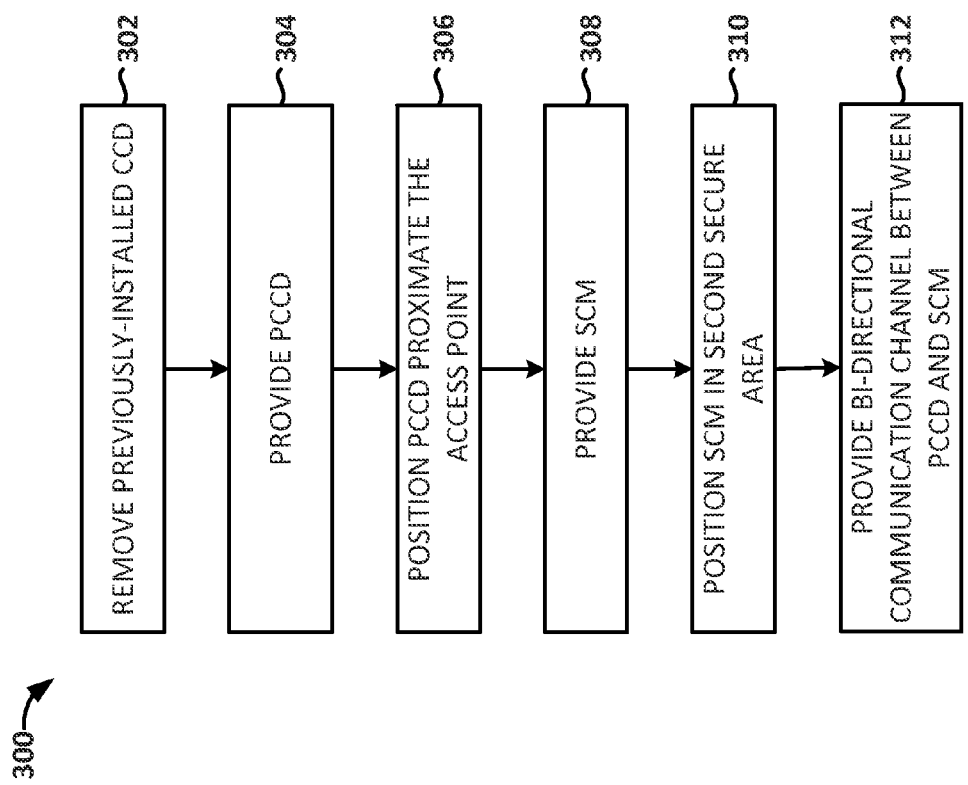
FIG. 3 illustrates a method for modifying an electronic access control system for securing an access point according to embodiments of the present invention.

Embodiments of the system 200 illustrated in FIG. 2 may be created by modifying a conventional electronic access control system, such as the system illustrated in FIG. 1A. FIG. 3 depicts an illustrative method 300 for modifying an electronic access control system for securing an access point to a first secure area. The electronic access control system permits access to the first secure area upon presentation of an authorized user access credential (UAC) that includes access control identification information. Embodiments of the method 300 include removing a previously-installed credential communication device (CCD) of the electronic access control system from a position proximate the access point (block 302) and providing a pass-through credential communication device (PCCD) (block 304). In embodiments, the PCCD may be adapted for bi-directional communication with the UAC. As depicted in FIG. 3, the method 300 further includes positioning the PCCD proximate the access point (block 306).

The method 300 also includes providing a secure cryptographic module (SCM) (block 308) and positioning the SCM in a second secure area (block 310). According to embodiments, the SCM may be adapted for bi-directional communication with the UAC via the PCCD, where the SCM is adapted to receive the access control identification information from the UAC, via the PCCD, in an encrypted form. Additionally, in embodiments, the SCM may include a cryptographic key for decrypting the encrypted form of the access control identification information. As depicted in FIG. 3, for example, embodiments of the method 300 include providing a bi-directional communication channel between the PCCD and the SCM (block 312).

By implementing embodiments of the method 300, the SCM may be operatively coupled to the ACC via the channel that previously coupled the CCD to the ACC (for example, a Wiegand channel). In embodiments, the ACC, the lock, and the channel coupling the ACC and/or the lock need not be modified from the form illustrated in FIG. 1A for creating embodiments of the system 200 illustrated in FIG. 2.

Embodiments of the system 200 illustrated in FIG. 2 may be used together with previously-issued UACs (that is, for example, UACs used with a conventional electronic access control system before modifying the system to provide the system 200 illustrated in FIG. 2) and/or newly-issued UACs. This may permit modification of conventional electronic access control systems at a facility at different times (for example, over the course of several weeks or months) and issuance of new UACs at different times. When all of the new UACs have been issued, the SCMs could be reconfigured such that the previously-issued UACs no longer provide access to the secure area(s) of the facility. For example, the SCMs could be configured to communicate with previously-issued UACs for a predetermined time period. For example, the facilities personnel might choose a time period of 45 days to permit adequate time for installation of the PCCDs and SCMs and progressive issuance of new UACs. This may permit installation of the PCCDs and SCMs without having to take the ACC offline. Additionally, the system can be properly vetted by facilities personnel and system down-time may be reduced.

Figure 4:
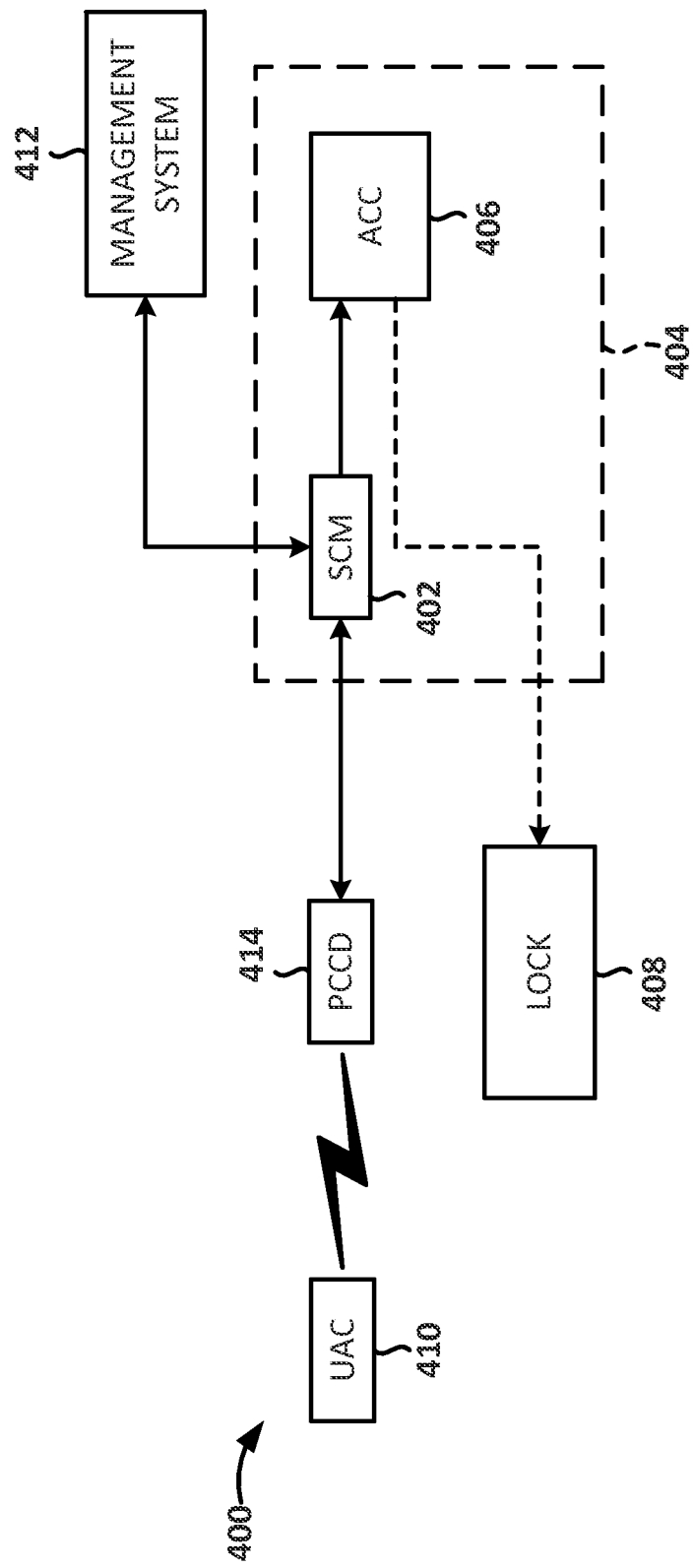
FIG. 4 illustrates another electronic access control system according to embodiments of the present invention.

FIG. 4 depicts an electronic access control system 400 according to embodiments of the present invention. The system 400 depicted in FIG. 4 may be similar to the system 200 illustrated in FIG. 2. However, the system 400 includes further functionality that may be used, for example, to facilitate monitoring, updating, and/or otherwise managing an SCM 402, disposed in a first secure area 404. In embodiments, the SCM 402 communicates with an ACC 406 that enables operation of a lock 408 upon presentation of an authorized UAC 410. As shown in FIG. 4, the system 400 includes a management system 412 that is communicatively coupled to the SCM 402. In embodiments, the management system 412 may facilitate providing new cryptographic keys, or any other information, such as new firmware, to the SCM 402 and/or one or more PCCDs 414. Embodiments of the management system 412 facilitate dynamic key management, firmware upgrades, system monitoring, remote operation and/or any number of other configuration, monitoring, and/or management operations.

According to embodiments, the management system 412 may comprise any number of devices, virtual devices, networks, and/or the like. For example, in embodiments, the management system 412 may include one or more computing devices configured to communicate, through a network or networks, with the SCM 402. The network may be, or include, any number of different types of communication networks such as, for example, a bus network, a short messaging service (SMS), a local area network (LAN), a wireless LAN (WLAN), a wide area network (WAN), the Internet, a P2P network, custom-designed communication or messaging protocols, and/or the like. The network may include a combination of multiple networks.

The illustrative system 400 shown in FIG. 4 is not intended to suggest any limitation as to the scope of use or functionality of embodiments of the present invention. Neither should the illustrative system 400 be interpreted as having any dependency or requirement related to any single component or combination of components illustrated therein. Additionally, any one or more of the components depicted in FIG. 4 may be, in embodiments, integrated with various ones of the other components depicted therein (and/or components not illustrated), all of which are considered to be within the ambit of the present invention.

Figure 5:
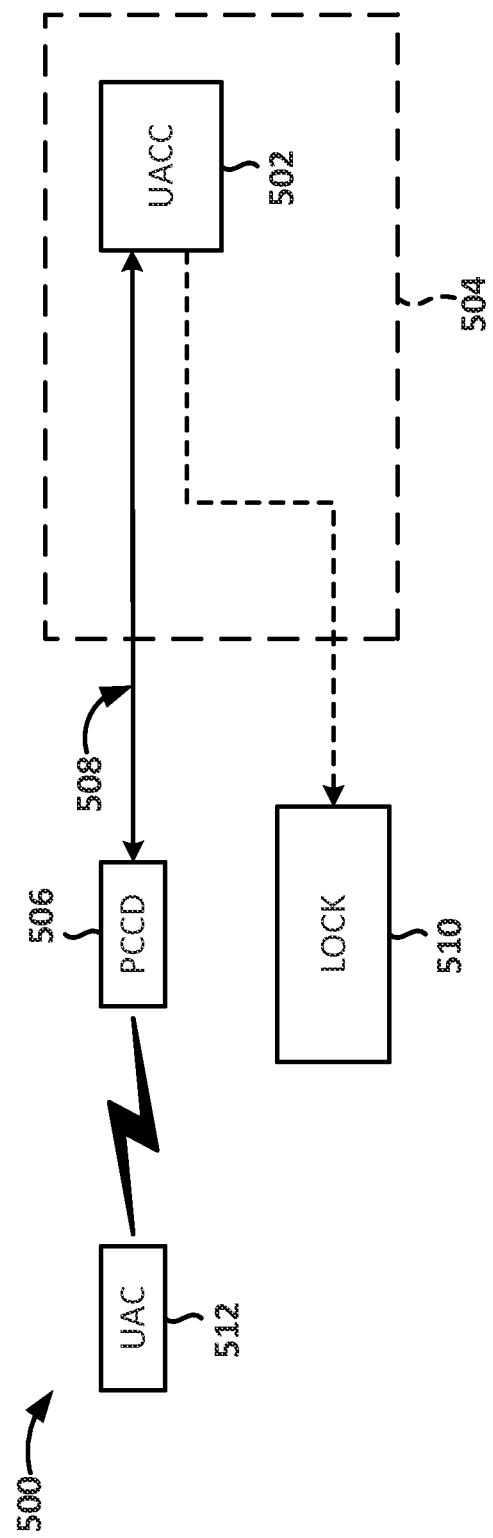
FIG. 5 illustrates another electronic access control system according to embodiments of the present invention.

FIG. 5 depicts an electronic access control system 500 according to embodiments of the present invention. Embodiments of the system 500 depicted in FIG. 5 may be similar to embodiments of the system 200 depicted in FIG. 2 and/or embodiments of the system 400 depicted in FIG. 4. However, the system 500 depicted in FIG. 5 includes an upgraded access control system computer (UACC) 502 disposed in a secure area 504. In embodiments, the UACC 502 incorporates one or more aspects of the functionality of an SCM (for example, the SCM 210 depicted in FIG. 2 and/or the SCM 402 depicted in FIG. 4) and may be configured to communicate directly with a PCCD 506 through a secure communications channel 508. The UACC 502 may be configured to disengage a lock 510 upon presentation of an authorized UAC 512. According to embodiments, one or more aspects of functionality described above in reference to the SCM 210 and/or the SCM 402 may be provided by the UACC 502 using hardware, software, and/or firmware. That is, in some embodiments, the communication capabilities, cryptographic keys, and algorithms of an SMC may be incorporated into the UACC 502. In this manner, for example, similar functionality may be achieved without needing to include an SCM as a separate hardware component.

The illustrative system 500 shown in FIG. 5 is not intended to suggest any limitation as to the scope of use or functionality of embodiments of the present invention. Neither should the illustrative system 500 be interpreted as having any dependency or requirement related to any single component or combination of components illustrated therein. Additionally, any one or more of the components depicted in FIG. 5 may be, in embodiments, integrated with various ones of the other components depicted therein (and/or components not illustrated), all of which are considered to be within the ambit of the present invention.

Figure 6:
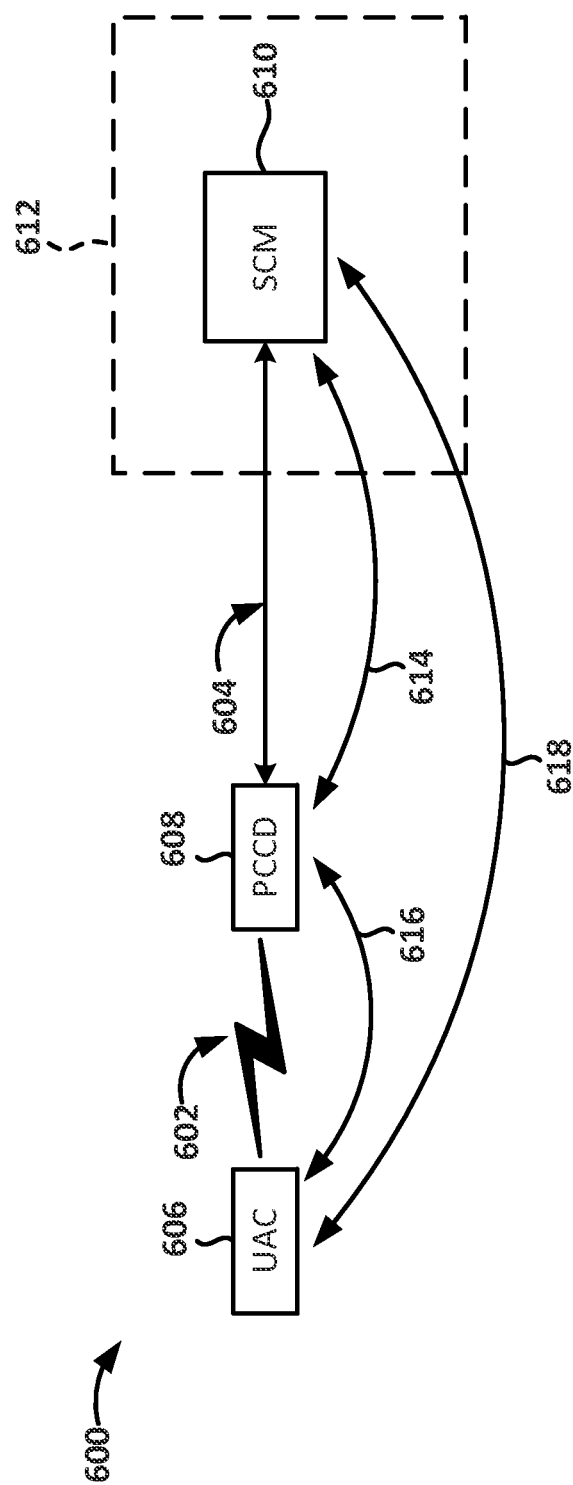
FIG. 6 illustrates another electronic access control system according to embodiments of the present invention.

FIG. 6 depicts an electronic access control system 600 according to embodiments of the present invention. The system 600 depicted in FIG. 6 may be similar to the system 200 depicted in FIG. 2, the system 400 depicted in FIG. 400, and/or the system 500 depicted in FIG. 5. The system 600 depicted in FIG. 6 includes enciphered communication channels between the various devices. For example, the communication channels 602 and 604 may be configured to facilitate secured transmission of signals between a UAC 606, a PCCD 608, and an SCM 610 (which may be disposed in a secure area 612). In embodiments, when no UAC 606 is present, the PCCD 608 and the SCM 610 may communicate together to maintain a live channel 614 over the physical communication channel 604.

The channel 614 may be enciphered to provide additional security. For example, the PCCD 608 may monitor one or more tamper sensors (see below) and may provide a tamper status to the SCM 610 in a secured manner, using the channel 614. As another example, the SCM 610 may provide firmware updates to the PCCD 608 in a secured manner, using the channel 614. A secure channel 616 between the UAC 606 and the PCCD 608 (for example, using a wireless communication 602) may provide a first layer of authentication between the two devices 606 and 608, upon presentation of the UAC 606 by the user. The authentication between the UAC 606 and the PCCD 608 allows the PCCD 608 to assure that the UAC 606 belongs to the system 600. After a successful authentication, the PCCD 608 may open a communication channel 618 between the UAC 606 and the SCM 610, for example, by passing the adequate messages through, at which point the SCM 610 and the UAC 606 may communicate in a direct manner (for example, by passing communications through the PCCD 608) over a secure channel to facilitate their secure transaction. That is, for example, the SCM 610 may be configured to securely retrieve the ACIN from the UAC 606.

Stated another way, in embodiments, the PCCD 608 completes a first communication with the UAC 606 upon presentation of the UAC 606 to the PCCD 608, and, upon completion of the first communication, the PCCD 608 allows the SCM 610 to initiate and complete a second communication with the UAC 606. In embodiments, for example, the PCCD 608 may continuously poll for UACs 606 within the vicinity of the PCCD 608. When a credential is in the vicinity of the PCCD 608, the PCCD 608 may communicate with the SCM 610 and indicate that a UAC 606 in the vicinity of the PCCD 608. Thereafter, the SCM 610 may communicate with the UAC 606. Embodiments of this configuration may facilitate reducing the processing burden on the PCCD 608. As such, the PCCD 608 may be a relatively inexpensive device and/or a device with relatively limited processing capabilities.

The term "channel," as used throughout this document, refers to a communication between at least two devices. In embodiments, a channel may include a dedicated communication connection, a periodic communication connection, and/or the like. A channel may refer to a point-to-point communication, a point-to-multipoint communication, a multipoint-to-point communication, and/or a multipoint-to-multipoint communication, and/or may include broadcast communication technologies, multicast communication technologies, and/or the like. A channel may include any number of connections, hops, routes, and/or the like, and may be configured using any number of wired and/or wireless protocols and communication technologies. In embodiments, a channel may be static and/or dynamic and may include any number of communications such as, for example, by employing any number of different multiplexing techniques such as, for example, time-division multiplexing, frequency-division multiplexing, code-division multiplexing, frequency-hopping techniques, and/or the like.

The illustrative system 600 shown in FIG. 6 is not intended to suggest any limitation as to the scope of use or functionality of embodiments of the present invention. Neither should the illustrative system 600 be interpreted as having any dependency or requirement related to any single component or combination of components illustrated therein. Additionally, any one or more of the components depicted in FIG. 6 may be, in embodiments, integrated with various ones of the other components depicted therein (and/or components not illustrated), all of which are considered to be within the ambit of the present invention.

Figure 7:
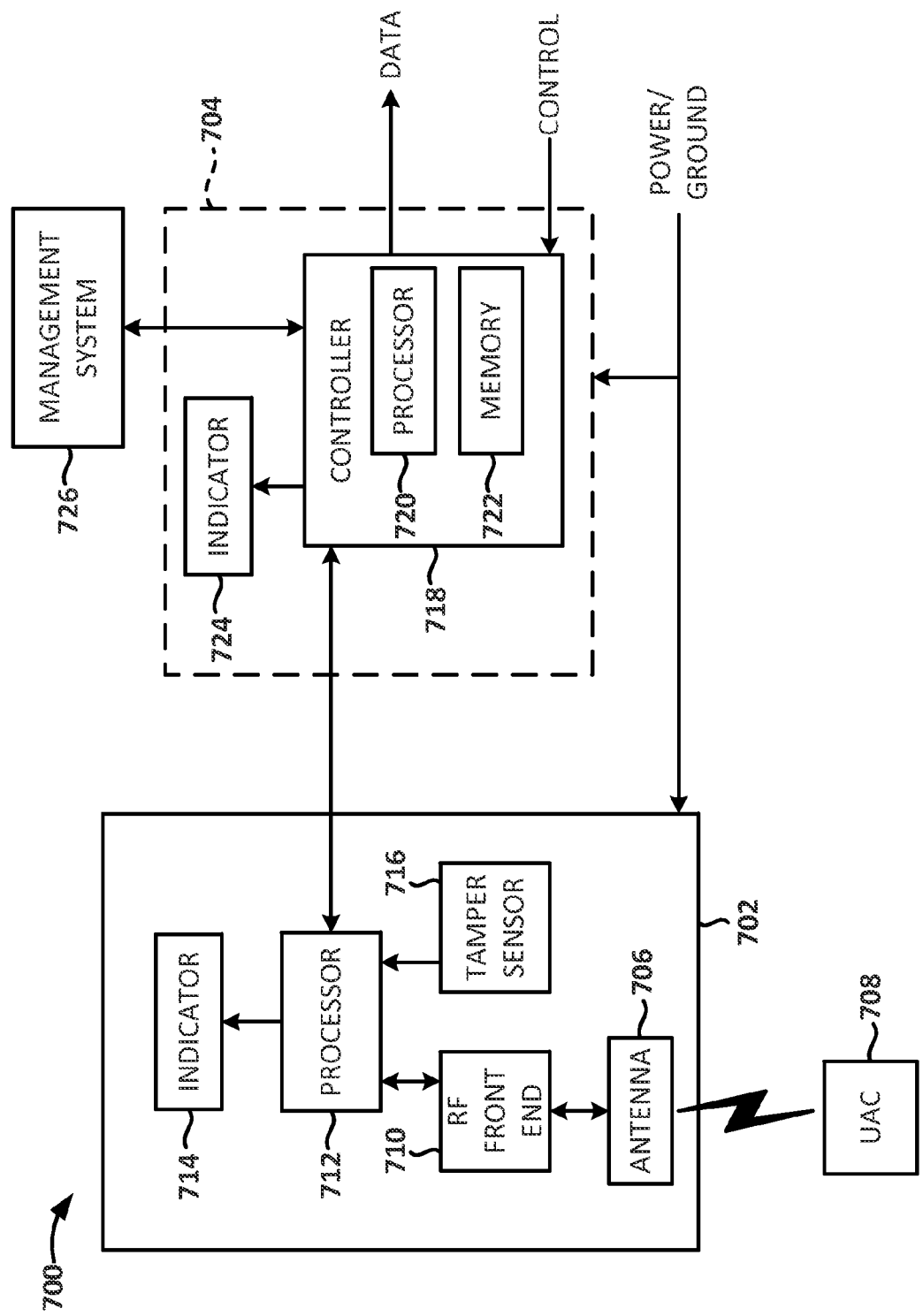
FIG. 7 partially illustrates another electronic access control system according to embodiments of the present invention.

FIG. 7 depicts an electronic access control system 700 according to embodiments of the present invention. The system 700 includes a PCCD 702, which may be, include, or be similar to the PCCD in any of the systems and/or methods described herein, and an SCM 704, which may be, include, or be similar to the SCM in any of the systems and/or methods described herein.

In embodiments of the system 700 illustrated in FIG. 7, the PCCD 702 includes an antenna 706 (for example, a radio frequency antenna) for securely and bi-directionally communicating with a UAC 708. The PCCD 702 also includes an RF front-end 710, a processor 712, and one or more indicators 714 (for example, visible alarms, such as LEDs, and audible alarms, such as sounders or buzzers). The PCCD 702 further includes a tamper sensor 716. The tamper sensor 716 may be, or include, a sensor that senses a voltage provided by a control line. Such a tamper sensor 716 may, for example, be configured to detect tampering if the sensed voltage drops to ground. In embodiments, the tamper sensor 716 may be, or include, a motion sensor configured to detect tampering by sensing motion of the PCCD 702. In this case, the tamper sensor 716 may include, for example, an accelerometer, an inertial measuring unit (IMU), a global positioning system (GPS) component, and/or the like. In embodiments, the tamper sensor 716 may continuously, continually, or periodically report the state of the tamper sensor 716 (for example, whether or not tampering is detected) to the SCM 704 via a cryptographically secured message.

In embodiments of the system 700 depicted in FIG. 7, the SCM 704 includes a controller 718 having a processor 720 and a memory 722 (for example, a secure non-volatile memory), and one or more indicators 724 (for example, visible alarms, such as LEDs, and audible alarms, such as sounders or buzzers). The memory 722 of the SCM 704 may contain, for example, the cryptographic keys. In this manner, embodiments of the invention may facilitate preventing the cryptographic keys from being physically accessed from the unsecure area.

In embodiments, communication channels between the UAC 708 and the SCM 704 may be cryptographically secured, in contrast to the one-way communication channels of conventional systems that often cannot be protected. In addition, according to embodiments of the invention, the control lines coupling the SCM 704 to an ACC cannot be accessed from the unsecure area. According to embodiments of the invention, the control lines can be monitored by the SCM and their state can be transmitted to the PCCD 702 through a message. According to embodiments of the invention, the system 700 may be created by modifying a conventional electronic access control system, such as the system illustrated in FIG. 1A. In this case, the system 700 may utilize one or more components of the conventional electronic access control system. For example, the system 700 may utilize the conventional one-way communication channel (for example, a Wiegand channel) for coupling the SCM 704 to a conventional ACC. In contrast to conventional systems, however, the system 700 may only include the one-way communication channel within a secure area. Additionally, in embodiments, the controller 718 may be configured to communicate with a management system 726, which may include any number of different types of management, monitoring, configuring, and/or updating functionality. For example, in embodiments, the management system 726 may be similar to the management system 412 depicted in FIG. 4.

The illustrative system 700 shown in FIG. 7 is not intended to suggest any limitation as to the scope of use or functionality of embodiments of the present invention. Neither should the illustrative system 700 be interpreted as having any dependency or requirement related to any single component or combination of components illustrated therein. Additionally, any one or more of the components depicted in FIG. 7 may be, in embodiments, integrated with various ones of the other components depicted therein (and/or components not illustrated), all of which are considered to be within the ambit of the present invention.

Figure 8:
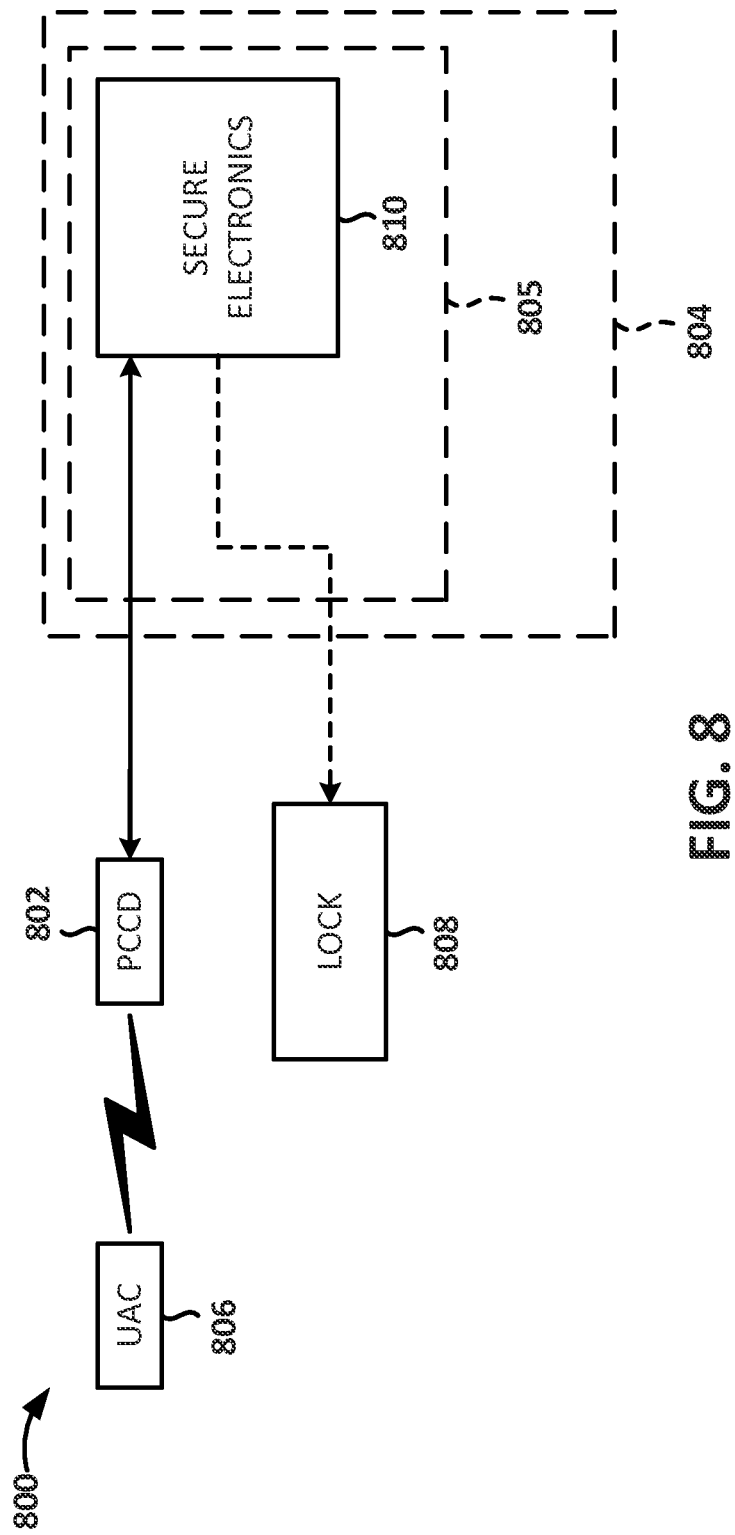
FIG. 8 illustrates yet another electronic access control system according to embodiments of the present invention.

FIG. 8 depicts an electronic access control system 800 according to embodiments of the present invention. The system 800 illustrated in FIG. 8 may be similar to any one or more of the systems illustrated in FIGS. 2 and 4-7. The system 800 illustrated in FIG. 8 includes a PCCD 802 that is disposed in an unsecure area of a facility and proximate an access point to a first secure area 804 of the facility. A UAC 806 is presented to the PCCD 802 to disable a lock 808 to gain access to the first secure area 804 via the access point. In embodiments, the PCCD 802 may securely and bi-directionally communicate with secure electronics 810 that are disposed within a second secure area 805. In this manner, the secure electronics 810 may bi-directionally communicate with the UAC 806 via the PCCD 802. For example, the secure electronics 810 may receive access control identification information from the UAC 806, via the PCCD 802, in an encrypted form. The secure electronics 810 may include a cryptographic key for decrypting the encrypted form of the access control identification information. The secure electronics 810 review the access control identification information and, upon determining that the user carrying the UAC 806 is authorized to enter the first secure area 804 (for example, based on the fact that the UAC 806 is an authorized UAC 806), permits access to the first secure area 804.

In embodiments, the PCCD 802 and the secure electronics 810 may be provided as an assembly or a module that is coupled to a wall of a building. The assembly may extend through the wall such that the PCCD 802 is positioned on an unsecure side of the wall (for example, on the exterior of the building) and the secure electronics 810 are positioned on a secure side of the wall (for example, in the interior of the building). In embodiments, the assembly may be provided as two or more components that communicate through the wall (for example, using a wire embedded in the wall and/or wirelessly).

According to embodiments, the secure electronics 810 includes a mechanism, component, system, or device for enabling access, at an access point, to a secure area. For example, the secure electronics 810 may include a component that communicates with a door lock to cause the door lock to disengage, a component that communicates with a security measure to cause the security measure to deactivate, and/or the like. The secure electronics may include an SCM, an ACC, a UACC and/or the like such as, for example, one or more aspects of embodiments of those described herein. According to embodiments, the secure electronics 810 may be, or include, any number of various configurations of hardware, software, and/or firmware. For example, the secure electronics 810 may include a computing device having a processor configured to execute computer-executable instructions to instantiate one or more components such as, for example, an SCM, an ACC, a UACC, and/or the like. In embodiments, the secure electronics 810 may be, or include, a service (for example, an application service, a web service, and/or the like) provided by a server, a distributed server system, and/or the like. In embodiments, the secure electronics 810 may be capable of: (1) securely downloading cryptographic keys; (2) securely uploading monitored activity (for example, access history information or tampering history information); (3) securely downloading firmware (for an SCM and/or one or more PCCDs); (4) securely downloading configuration; (5) securely updating cryptographic keys of one or more UACs; and/or the like.

The illustrative system 800 shown in FIG. 8 is not intended to suggest any limitation as to the scope of use or functionality of embodiments of the present invention. Neither should the illustrative system 800 be interpreted as having any dependency or requirement related to any single component or combination of components illustrated therein. Additionally, any one or more of the components depicted in FIG. 8 may be, in embodiments, integrated with various ones of the other components depicted therein (and/or components not illustrated), all of which are considered to be within the ambit of the present invention.

According to embodiments, various components of any one or more of the systems 100, 200, 400, 500, 600, 700, and 800, illustrated, respectively, in FIGS. 1, 2, and 4-8, may be implemented on one or more computing devices. A computing device may include any type of computing device suitable for implementing embodiments of the invention. Examples of computing devices include specialized computing devices (for example, embodiments of PCCDs, SCMs, ACCs, UACCs, etc.) and/or general-purpose computing devices such "workstations," "servers," "laptops," "desktops," "tablet computers," "hand-held devices," and the like, all of which are contemplated within the scope of FIGS. 1, 2, and 4-8 with reference to various components of various embodiments of the systems 100, 200, 400, 500, 600, 700, and 800.

In embodiments, a computing device includes a bus that, directly and/or indirectly, couples one or more of the following devices: a processor, a memory, an input/output (I/O) port, an I/O component, and a power supply. Any number of additional components, different components, and/or combinations of components may also be included in the computing device. The bus represents what may be one or more busses (such as, for example, an address bus, data bus, or combination thereof). Similarly, in embodiments, the computing device may include a number of processors, a number of memory components, a number of I/O ports, a number of I/O components, and/or a number of power supplies. Additionally any number of these components, or combinations thereof, may be distributed and/or duplicated across a number of computing devices.

In embodiments, the memory includes computer-readable media in the form of volatile and/or nonvolatile memory and may be removable, nonremovable, or a combination thereof. Media examples include Random Access Memory (RAM); Read Only Memory (ROM); Electronically Erasable Programmable Read Only Memory (EEPROM); flash memory; optical or holographic media; magnetic cassettes, magnetic tape, magnetic disk storage or other magnetic storage devices; data transmissions; or any other medium that can be used to store information and can be accessed by a computing device such as, for example, quantum state memory, and the like. In embodiments, the memory stores computer-executable instructions for causing the processor to implement aspects of embodiments of system components discussed herein and/or to perform aspects of embodiments of methods and procedures discussed herein. Computer-executable instructions may include, for example, computer code, machine-useable instructions, and the like such as, for example, program components capable of being executed by one or more processors associated with a computing device. Program components may be programmed using any number of different programming environments, including various languages, development kits, frameworks, and/or the like. Some or all of the functionality contemplated herein may also be implemented in hardware and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above described features.

The following is claimed:

1. An electronic access control system for securing an access point to a first secure area, the electronic access control system permitting access to the first secure area via an access control system computer upon presentation of an authorized user access credential, the authorized user access credential comprising access control identification information, the electronic access control system comprising:

a pass-through credential communication device adapted to be disposed in an unsecured area proximate the access point and to which the authorized user access credential is presented, the pass-through credential communication device being adapted for bi-directional communication with the authorized user access credential; and a secure cryptographic module adapted to be disposed in a second secure area, the secure cryptographic module bi-directionally communicating with the pass-through credential communication device and being adapted for bi-directional communication with the authorized user access credential via the pass-through credential communication device, the secure cryptographic module being adapted to receive the access control identification information from the authorized user access credential, via the pass-through credential communication device, in an encrypted form, and the secure cryptographic module comprising a cryptographic key for decrypting the encrypted form of the access control identification information;

wherein the electronic access control system permits access to the first secure area via the access control system computer in response to the secure cryptographic module decrypting the encrypted form of the access control identification information.

2. The electronic access control system of claim 1, wherein the pass-through credential communication device comprises a tamper sensor and reports a state of the tamper sensor to the secure cryptographic module via a cryptographically secured message.

3. The electronic access control system of claim 2, wherein the tamper sensor comprises a motion sensor.

4. The electronic access control system of claim 2, wherein the secure cryptographic module and the pass-through credential communication device establish a cryptographic communication channel for secure transmission of at least one of the cryptographically secured message and firmware uploads.

5. The electronic access control system of claim 4, wherein the cryptographic communication channel is a first cryptographic communication channel, and wherein the secure cryptographic module establishes a second cryptographic communication channel with the authorized user access credential for secure transmission of the access control identification information.

6. The electronic access control system of claim 1, wherein the pass-through credential communication device completes a first communication with the authorized user access credential upon presentation of the authorized user access credential to the pass-through credential communication, wherein upon completion of the first communication the pass-through credential communication device allows the secure cryptographic module to initiate and complete a second communication with the authorized user access credential.

7. The electronic access control system of claim 1, wherein the secure cryptographic module comprises a Wiegand output for transmitting the access control identification information of the authorized user access credential to the access control system computer, and the electronic access control system permits access to the first secure area in response to the access control system computer receiving the access control identification information of the authorized user access credential.

8. The electronic access control system of claim 7, further comprising at least one control line operably coupling the access control system computer to the access point, wherein the secure cryptographic module comprises at least one input for monitoring a state of the control line, and the secure cryptographic module reports the state of the control line to the pass-through credential communication device via a cryptographically secured message.

9. The electronic access control system of claim 7, further comprising a plurality of access control system computers including the access control system computer, and wherein the secure cryptographic module bi-directionally communicates with each of the plurality of access control system computers.

10. The electronic access control system of claim 1, wherein the secure cryptographic module is adapted to at least one of: (1) securely download cryptographic keys; (2) securely upload monitored activity; (3) securely download firmware; (4) securely download configuration; and (5) securely update cryptographic keys of the authorized user access credential.

11. The electronic access control system of claim 1, further comprising a plurality of pass-through credential communication devices including the pass-through credential communication device, and wherein the secure cryptographic module bi-directionally communicates with each of the plurality of pass-through credential communication devices.

12. The electronic access control system of claim 1, wherein the secure cryptographic module comprises a plurality of cryptographic keys including the cryptographic key, and the secure cryptographic module is adapted to update cryptographic keys of the authorized user access credential.

13. The electronic access control system of claim 1, wherein the second secure area is within the first secure area.

14. A method for modifying an electronic access control system for securing an access point to a first secure area, the electronic access control system permitting access to the first secure area via an access control system computer upon presentation of an authorized user access credential, the authorized user access credential comprising access control identification information, the method comprising:

removing a previously-installed credential communication device of the electronic access control system from a position proximate the access point;

providing a pass-through credential communication device, the pass-through credential communication device being adapted for bi-directional communication with the authorized user access credential;

positioning the pass-through credential communication device in an unsecured area proximate the access point;

providing a secure cryptographic module, the secure cryptographic module being adapted for bi-directional communication with the authorized user access credential via the pass-through credential communication device, the secure cryptographic module being adapted to receive the access control identification information from the authorized user access credential, via the pass-through credential communication device, in an encrypted form, and the secure cryptographic module comprising a cryptographic key for decrypting the encrypted form of the access control identification information;

positioning the secure cryptographic module in a second secure area; and providing a bi-directional communication channel between the pass-through credential communication device and the secure cryptographic module;

wherein the electronic access control system is configured to permit access to the first secure area via the access control system computer in response to the secure cryptographic module decrypting the encrypted form of the access control identification information.

15. The method of claim 14, wherein the access control system computer is a previously-installed access control system computer, and further comprising coupling the secure cryptographic module to the previously-installed access control system computer via a previously-installed communication channel, the previously-installed access control system being adapted to permit access to the first secure area in response to the secure cryptographic module decrypting the encrypted form of the access control identification information.

16. The method of claim 14, wherein the authorized user access credential is a previously-issued authorized user access credential, the electronic access control system permitting access to the first secure area upon presentation of the previously-issued authorized user access credential to the previously-installed credential communication device prior to removing the previously-installed credential communication device from the position proximate the access point, and the electronic access control system permitting access to the first secure area upon presentation of the previously-issued authorized user access credential to the pass-through credential communication device after positioning the pass-through credential communication device proximate the access point.

17. The method of claim 16, further comprising providing a second authorized user access credential, the electronic access control system permitting access to the first secure area upon presentation of the second authorized user access credential to the pass-through credential communication device after positioning the pass-through credential communication device proximate the access point.

18. An electronic access control system for securing an access point to a secure area of a building, the electronic access control system permitting access to the secure area upon presentation of an authorized user access credential, the authorized user access credential comprising access control identification information, the electronic access control system comprising:

a pass-through credential communication device adapted to be disposed on an unsecure side of a wall of the building proximate the access point and to which the authorized user access credential is presented, the pass-through credential communication device being adapted for bi-directional communication with the authorized user access credential; and secure electronics adapted to be disposed on a secure side of the wall of the building, the secure electronics bi-directionally communicating with the pass-through credential communication device and being adapted for bi-directional communication with the authorized user access credential via the pass-through credential communication device, the secure electronics being adapted to receive the access control identification information from the authorized user access credential, via the pass-through credential communication device, in an encrypted form, and the secure electronics comprising a cryptographic key for decrypting the encrypted form of the access control identification information;

wherein the electronic access control system permits access to the secure area in response to the secure electronics decrypting the encrypted form of the access control identification information.

19. The electronic access control system of claim 18, wherein the secure electronics comprise an updated access control system computer comprising the cryptographic key for decrypting the encrypted form of the access control identification information, the updated access control system computer permitting access to the secure area in response to decrypting the encrypted form of the access control identification information.

20. The electronic access control system of claim 18, wherein the pass-through credential communication device comprises a tamper sensor and reports a state of the tamper sensor to the secure electronics via a cryptographically secured message.

21. The electronic access control system of claim 20, wherein the tamper sensor comprises a motion sensor.

22. The electronic access control system of claim 18, wherein the pass-through credential communication device completes a first communication with the authorized user access credential upon presentation of the authorized user access credential to the pass-through credential communication, wherein upon completion of the first communication the pass-through credential communication device allows the secure electronics to initiate and complete a second communication with the authorized user access credential.

23. The electronic access control system of claim 18, further comprising a plurality of pass-through credential communication devices including the pass-through credential communication device, and wherein the secure electronics bi-directionally communicate with each of the plurality of pass-through credential communication devices.

* * * * *